(12) United States Patent
Kremerman

(10) Patent No.: US 9,895,627 B2
(45) Date of Patent: Feb. 20, 2018

(54) HIGH EFFICIENCY DISTRIBUTION ADAPTER AND METHOD OF USE

(71) Applicant: Elliot Kremerman, Scotts Valley, CA (US)

(72) Inventor: Elliot Kremerman, Scotts Valley, CA (US)

(*) Notice: Subject to any disclaimer, the term of this patent is extended or adjusted under 35 U.S.C. 154(b) by 0 days.

(21) Appl. No.: 15/684,288

(22) Filed: Aug. 23, 2017

(65) Prior Publication Data

US 2017/0348610 A1 Dec. 7, 2017

(51) Int. Cl.
*B01D 3/32* (2006.01)
*B01D 5/00* (2006.01)

(52) U.S. Cl.
CPC ............ *B01D 3/32* (2013.01); *B01D 5/006* (2013.01); *B01D 5/009* (2013.01)

(58) Field of Classification Search
CPC ............. B01D 3/32; B01D 5/006; B01J 19/30
See application file for complete search history.

(56) References Cited

U.S. PATENT DOCUMENTS

| | | | | | |
|---|---|---|---|---|---|
| 2,383,377 | A | * | 8/1945 | Evans | G01N 25/145 202/190 |
| 2,427,142 | A | * | 9/1947 | Hornbacher | G01N 25/145 165/11.1 |
| 2,468,872 | A | * | 5/1949 | Goldsbarry | B01D 3/4205 202/185.1 |
| 2,701,789 | A | * | 2/1955 | White | B01D 3/4205 202/161 |
| 3,120,119 | A | * | 2/1964 | Luther | G01N 25/08 202/160 |
| 3,240,682 | A | * | 3/1966 | Irving | G01N 25/14 202/158 |
| 3,334,025 | A | * | 8/1967 | Reid | B01D 3/00 202/161 |
| 3,607,662 | A | * | 9/1971 | Glover | B01D 3/14 202/160 |
| 3,812,010 | A | * | 5/1974 | Nitsch | C13K 3/00 127/41 |
| 3,837,830 | A | * | 9/1974 | Eberhart | B01L 3/569 422/935 |
| 3,951,175 | A | * | 4/1976 | Eberhart | B01L 3/569 138/103 |
| 5,164,049 | A | * | 11/1992 | Clark | B01D 1/02 134/12 |
| 5,354,428 | A | * | 10/1994 | Clark | B01D 1/02 159/DIG. 19 |
| 5,873,980 | A | * | 2/1999 | Young | B01D 5/0063 196/98 |
| 9,682,331 | B2 | * | 6/2017 | Kremerman | B01D 3/10 |

* cited by examiner

*Primary Examiner* — Jonathan Miller
(74) *Attorney, Agent, or Firm* — Michael J. Feigin, Esq.; Feigin and Fridman

(57) ABSTRACT

A distribution chamber disclosed discharges a fraction which have been fractionally distilled in embodiments of the disclosed technology. The distribution chamber is removably connected to a distillation head such that between each fraction, the distribution head can be switched with another. Each such distribution head has a vertically extending drain and/or discharge port, or plurality thereof, to distribute a discharged fraction into a single flask, such port being at an acute angle to an intake port. In this manner, the discharge/drain port(s) can be vertically oriented and at a bottom side of the distribution chamber when the intake port is connected to the distillation head.

13 Claims, 10 Drawing Sheets

HIGH EFFICIENCY DISTRIBUTION ADAPTER AND METHOD OF USE

FIELD OF THE DISCLOSED TECHNOLOGY

The disclosed technology relates generally to distillation and, more specifically, to a distribution adapter which connects to a distillation head.

BACKGROUND OF THE DISCLOSED TECHNOLOGY

Distillation or fractional distillation is carried out by heating a solid or liquid and removing gaseous vapors that are expelled therefrom. This can be done while raising the temperature, as each compound boils at a different temperature. Distribution adapters, also referred to as "cows" due to their appearance which is similar to a cow udder, typically have a centered female joint. The discharge ports ("udders") are either "pushed out" or are pointing downward with three or four typical discharge ports. These other ports offer a traveling pathway for a vacuum (typically used in the distribution adapter) to cause unintentional evaporation of compounds that have a lower boiling point or resilience against a vacuum. This causes partial contamination and depletion of a vacuum.

Further, when distilling multiple fractions (a fraction having a distinct boiling point or range of boiling points within a tolerance level of the distinct boiling point), one typically turns a prior art cow so that the next fraction extends into the next discharge port, which now becomes the lowest port ("lowest" meaning "closest to the surface of the Earth" or "closest to a vector direction in which gravity is pulling"). Those fractions with more energy (e.g. higher boiling point) are distilled later, in a subsequent port, compared to those with less energy. The problem with this method is that the smell of one fraction and it's vapors which have not fully condensed end up in the next fraction, contaminating this next fraction in any or multiple of smell, taste, color, and product.

A general problem with all distribution collection adapters is that even when three ports which are present to receive distillate product evacuated from a distillation head, any condensation or discharge from collected volatile vapors drip as a solid phase solution along the side of the collection assembly itself, and directly drip back into the collection flask. This is the traditional method that has become a customary problem with glassware. As a result, the distillate product becomes contaminated or is less pure than the ideal.

What is needed in the art is a way to distill or fractionally distill contents in a more pure manner, which means finding a way to increase isolation of distillate fractions to be collected.

SUMMARY OF THE DISCLOSED TECHNOLOGY

In order to solve the drawbacks of the prior art, a distribution adapter, which is disclosed herein, is designed for use with a single distillate fraction at a time. After distilling a particular fraction, the distribution adapter is removed and replaced with another, such as a similar distribution adapter made of the same construction or variations described herein. However, each distribution adapter or "cow" in embodiments of the disclosed technology is designed/usable to separate liquid (re-condensed) fractions from vapors and the like, into separate discharge and drain portals, as described below.

A distribution adapter of embodiments of the disclosed technology has an elongated main body with an intake port at a narrow side of the elongated main body adapted to removably connect to a distillation unit during distillation. A drain port and a discharge port open into the elongated main body and on a same side as each other, the drain port having a larger circumference than the discharge port in some embodiments of the disclosed technology. A vacuum port opens into the elongated main body on an opposite side as the discharge port in some embodiments of the disclosed technology.

A rounded end section of the elongated main body, opposite the intake port is in embodiments of the disclosed technology, the discharge port being between the rounded end section and the intake port. Two chiller ports on a same side of the elongated main body (as each other), each open into a single spiral-shaped chiller within the elongated main body in some embodiments. The chiller can be used to cool or heat parts of/within the elongated main body. A portion of the distillation unit extends through a narrower neck region of the main body and into a wider region of the main body.

The drain port and the discharge port are in parallel to each other and at an acute angle to the elongated main body in embodiments of the disclosed technology. The distribution adapter is connected to the distillation unit and oriented such that the elongated main body is at an acute angle to the ground (assuming a substantially level or flat ground, table, or support structure or alternatively, being in a direction of the pull of gravity). A single exterior opening into the discharge port and a single exterior opening into the drain port can also face towards the ground, which is synonymous, for purposes of this disclosure, with a gravitational direction of pull.

The distribution adapter is adapted to be attached and removed to the distillation unit during active distillation. As such, the distribution adapter is removed from the distillation head substantially after a first fraction is distilled and a second substantially identical distribution adapter to the (first) distribution adapter is attached to the distillation unit during distillation of a second fraction. A distillation unit, for purposes of this disclosure, is a device just above a heat source which is used to separate a substance based on different boiling points of contents within the substance.

In a method of using a distribution adapter of the embodiments of the disclosed technology, such as the above-described distribution adapter, one attaches an intake port of the distribution adapter to an output of a distillation unit, such that the intake port is at the highest point of the distribution adapter. This means it is furthest from the ground, of any of the regions of the named parts of the distribution adapter. Then a substance is distilled through the distillation unit such that output therefrom enters the intake port of the distribution adapter. Liquefied condensation from the substance is connected into a drain port of the distribution adapter, the drain port pointed (substantially) downwards and at an acute angle to the intake port. A discharge port also opens into an elongated body of the distribution adapter such that the discharge port opens into a substantially lowest point of the elongated body or at least a lower half thereof. The distribution adapter is removed from the distillation unit after collection of a first fraction distilled from the substance. A second distribution adapter is then attached to the distillation unit while distilling a second fraction of the substance, the second fraction having a higher (average) boiling point than the first fraction.

The distribution adapter can also have a vacuum port which is oriented upwards of substantially there-so during distillation. An upwards suction force can be applied on the distribution adapter (or it's elongated interior region/portion), this force extending through the vacuum port. An output end of the distillation unit, in some embodiments, extends through a narrower neck region of the distribution adapter into a wider main body of the distribution adapter. The narrower neck region connects the intake port to the wider main body of the distribution adapter. "Narrower" and "wider" refer to sizes of a circumference of respective parts, "circumference" being the distance around a circle or substantially circular shape.

A step of cooling or heating the main body of the distribution adapter by passing fluid between two liquid chiller ports can also take place. The liquid chiller ports open into a spiral-shaped chamber within the main body of some embodiments of the disclosed technology.

Any device or step to a method described in this disclosure can comprise, or consist of, that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A distribution chamber disclosed discharges a fraction which have been fractionally distilled in embodiments of the disclosed technology. The distribution chamber is removably connected to a distillation head such that between each fraction, the distribution head can be switched with another. Each such distribution head has a vertically extending drain and/or discharge port, or plurality thereof, to distribute a discharged fraction into a single flask, such port being at an acute angle to an intake port. In this manner, the discharge/drain port(s) can be vertically oriented and at a bottom side of the distribution chamber when the intake port is connected to the distillation head.

Embodiments of the disclosed technology will become more clear in view of the following discussion of the figures.

Figure 1:
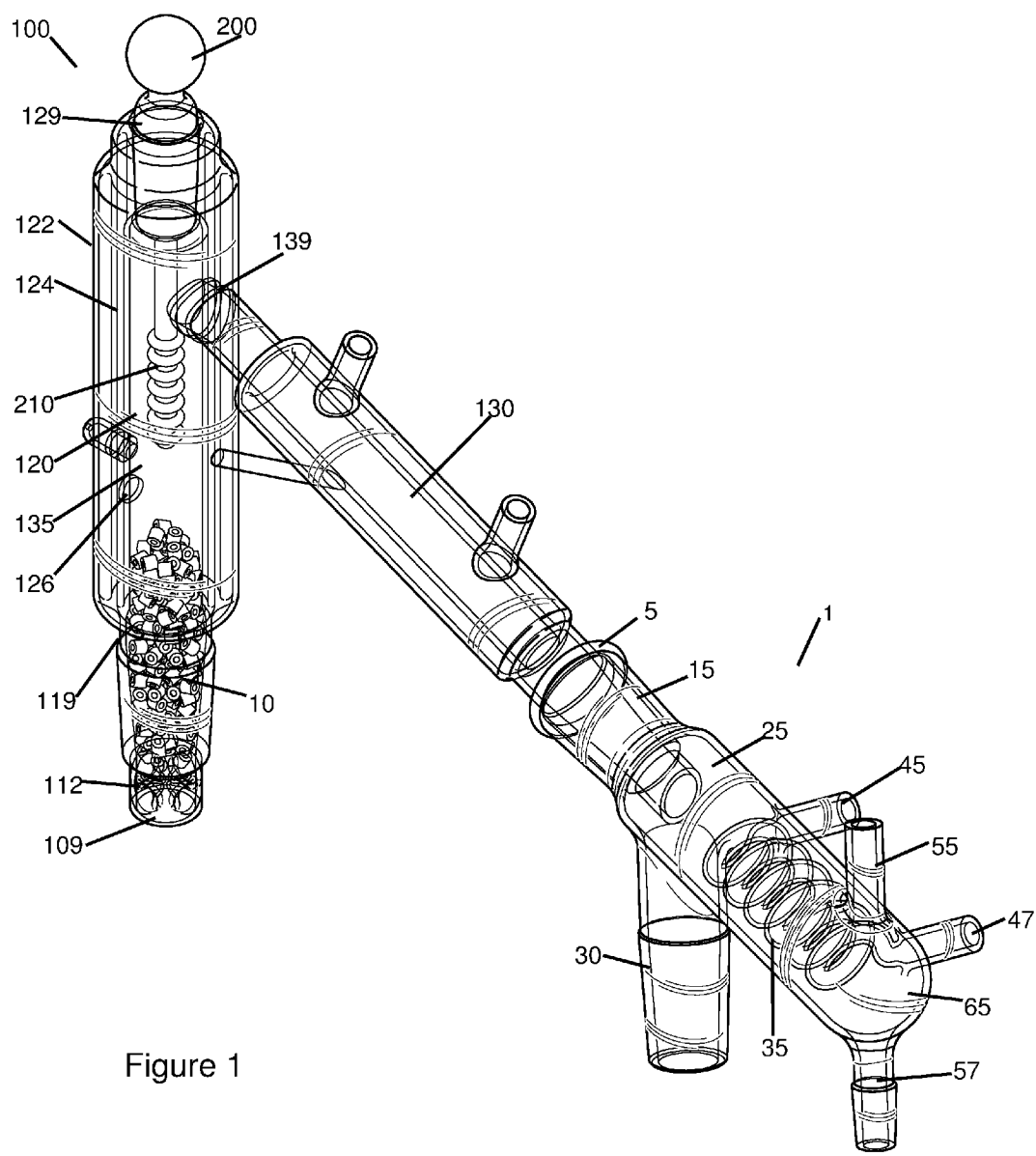
FIG. 1 shows a perspective view of a distillation head with key and Raschig rings connected to a distribution adapter of embodiments of the disclosed technology.

FIG. 1 shows a perspective view of a distillation head with key and Raschig rings connected to a distribution adapter of embodiments of the disclosed technology. The distillation head or distillation device 100 is typically above a head source and a substance to be fractionally distilled through the distillation head. This is accomplished by having a substance which itself is comprised of multiple different compounds, elements, or parts which have different boiling points than one another. This substance, which can be liquid, solid or some combination of each, is heated until gaseous vapors enter through the bottom portal 109 of a distillation head 100. From there, vapors exit out a side portal 139 and condense or pass as gas through a discharge chamber 130 (part of the distillation head). The distribution adapter 1 has an inlet portal 5 and drain port 30. As described in the background, distribution heads typically are "cows" with a plurality of discharge ports. In the prior art, one turns the cow to change from one discharge port to another, but this is often imprecise and leads to contamination and passage of smells between ports. Here, in order to avoid contamination, the distribution adapter 1 is designed to be removed completely and replaced with another between fractions which are distilled. So, for example, a first fraction might have a boiling point at a first comparatively lower temperature to a second fraction with a comparatively higher temperature fraction. When distilling the first fraction, a first mono-distribution adapter 1 is used, and after the first fraction is completely distilled, one removes the first mono-distribution adapter 1 and replaces same with a second such mono-distribution adapter 1. One can, is desired or needed, continue the distillation process without a mono-distribution adapter 1 between a first and second fraction being distilled and/or including some of the first and second fraction distillation in order to avoid contamination, or use another distribution adapter in between to collect product which is potentially comprising a mixture of the first and second fraction.

Discussing now the distillation head, it should be understood that any distillation head can be used. The head shown is by way of example, but any head which discharges a vapor or liquid can be used. The distillation head or fractional distillation head 100 has a vertically extending inner chamber 120. This vertically extending inner chamber 120 is, in embodiments of the disclosed technology, the longest single element of the distillation head 100 and is designated as "vertical" as this is it's typical orientation during use. For purposes of this disclosure, directions are relative to the vertical direction, as shown in FIG. 1, for example. This vertical and largest chamber 120 of embodiments of the disclosed technology has a top portal 129, a bottom portal 109, and a side portal 139. The top and bottom portals are opposite to each other and a secondary bottom portal 119 is at a point where the inner chamber increases in horizontal cross-sectional area. A discharge chamber 130 is where vapors re-condense and exit, after passing through the side portal 139 and then through the discharge chamber itself.

Raschig rings or packing 10 can be placed within the chamber 120 supported by a pinched region 112. The pinched region 112 is, in some embodiments of the disclosed technology, formed simultaneous to, and is an integral part of a piece of glass which makes up the entirety of the distillation chamber 100 or at least the walls of the inner vertical chamber 120. Thus, the vertical inner chamber 120 is defined by side walls extending between the top portal 129 and bottom portal 109. Parts of the vertical inner chamber 120 are surrounded, in embodiments of the disclosed technology, by an airtight jacket 124, in embodiments of the disclosed technology, which shares a side wall with the inner vertical chamber where the jacket surrounds the inner vertical chamber. Further, a second airtight jacket 126 surrounds the inner jacket 124 making a double layered jacket. The outer walls of the outer jacket 126, in embodiments of the disclosed technology, are also the outer walls of a portion of the vertical section of the head 100 which the outer jacket 126 encloses. The jacket 124 and 126 extend substantially or fully the same distance from top to bottom of the head 100 and can share airspace by way of a portal 126 cut into the shared wall between the two jackets. The portal 126 can be a circle shaped portal, the circle being oriented vertically. As such, stress on one of the jackets which causes higher pressure there-in is split more evenly through both jackets 124 and 126 as air can move from one to the other to equalize pressure between the jackets.

The packing material or Raschig rings 10 are supported by the pinched region 112 and held-there above due to either their larger size such that they cannot fit through the pinched region in one or all dimensions (e.g. orientations of the packing material) or due to their abutment against each other. The Raschig rings are packing material 10 is added through the more narrow region of the head 100 (between the pinched region 112 and portal 119, where the vertical section 120 becomes wider) and in some embodiments, at least partially into the wider region of the vertical section 120.

In some embodiments, a key 200 is inserted through the top portal 129 of the vertical chamber 120. The key can seal the portal 200, or substantially seal the portal 200 and extends downwards into the inner region of the vertical chamber 120. This key can have one or more rings 210 which are spaced apart from each other and promote condensation of vapors which rise vertically to the level of the rings/key. The rings 210 can be below the side portal 139 in embodiments of the disclosed technology. Still further, they key can be equi-spaced from the side walls of one or more of the jacket 122, jacket 124, and/or inner section 120 of the head 100. This makes the key centered with respect to the vertical section of the distillation head 100.

Note also that there can be an unencumbered region 135 within the hollow interior vertically oriented space 120 of the head 100. This unencumbered region has air and/or the vapors/material being distilled as the material passes from the load flask chamber/bottom portal 109 out through the distillate/side portal 139. This unencumbered region 135 can be defined or vary in a few ways. It can be at a mid-region (encompassing or crossing at least a 40% to 60% space between top and bottom of the device), or be above the Raschig rings/packing and below the key 200 and it's rings 210. Further, it can be below the side portal 139 and above the narrow region and the portal 119 entering thereto. This region is where the vapors can move upwards freely, with the cooler vapors or those with a higher boiling point than the temperature of the unencumbered region 135 and region with the packing material 10, condensing and remaining therein. On the opposite side, vapors within the Raschig rings 10 can move up freely due to the lack of temperature gradient between the narrow region 112 and top of the Raschig rings as well as the unencumbered region. This results in a very even temperature distillation process.

Referring now to the distribution adapter 1, the distribution adapter is seen in FIG. 1 removably connected and/or functionally connected to the distillation head 100. "Removably" is defined as "designed to be attached and detached over one hundred times while still continuing to function properly as designed." "Functionally connected" is defined, for purposes of this disclosure, as "passing liquids or solid there-between the connected parts with over 95% or 99% accuracy."

Figure 2:
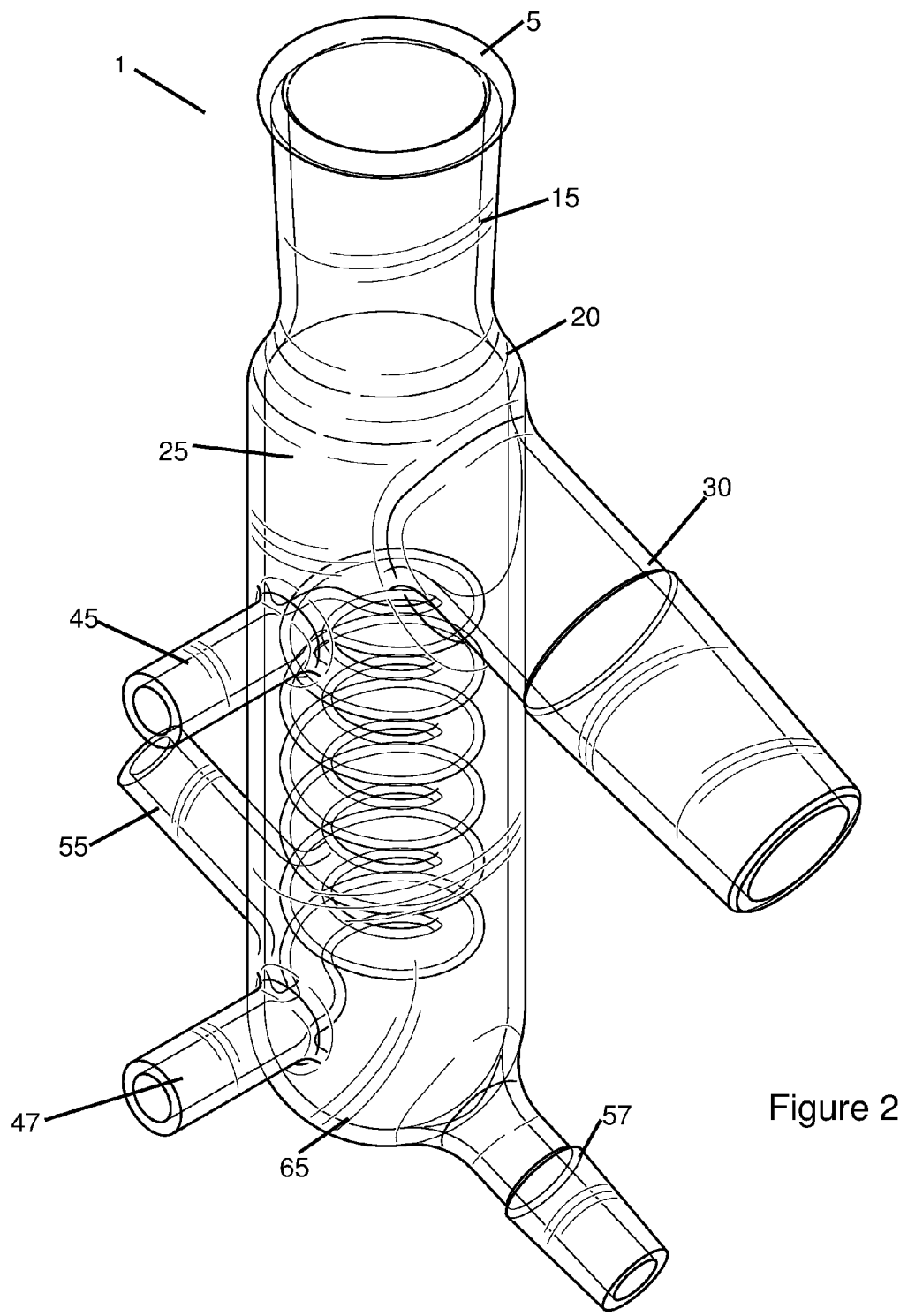
FIG. 2 shows a first perspective view of the distribution adapter of FIG. 1.
Figure 3:
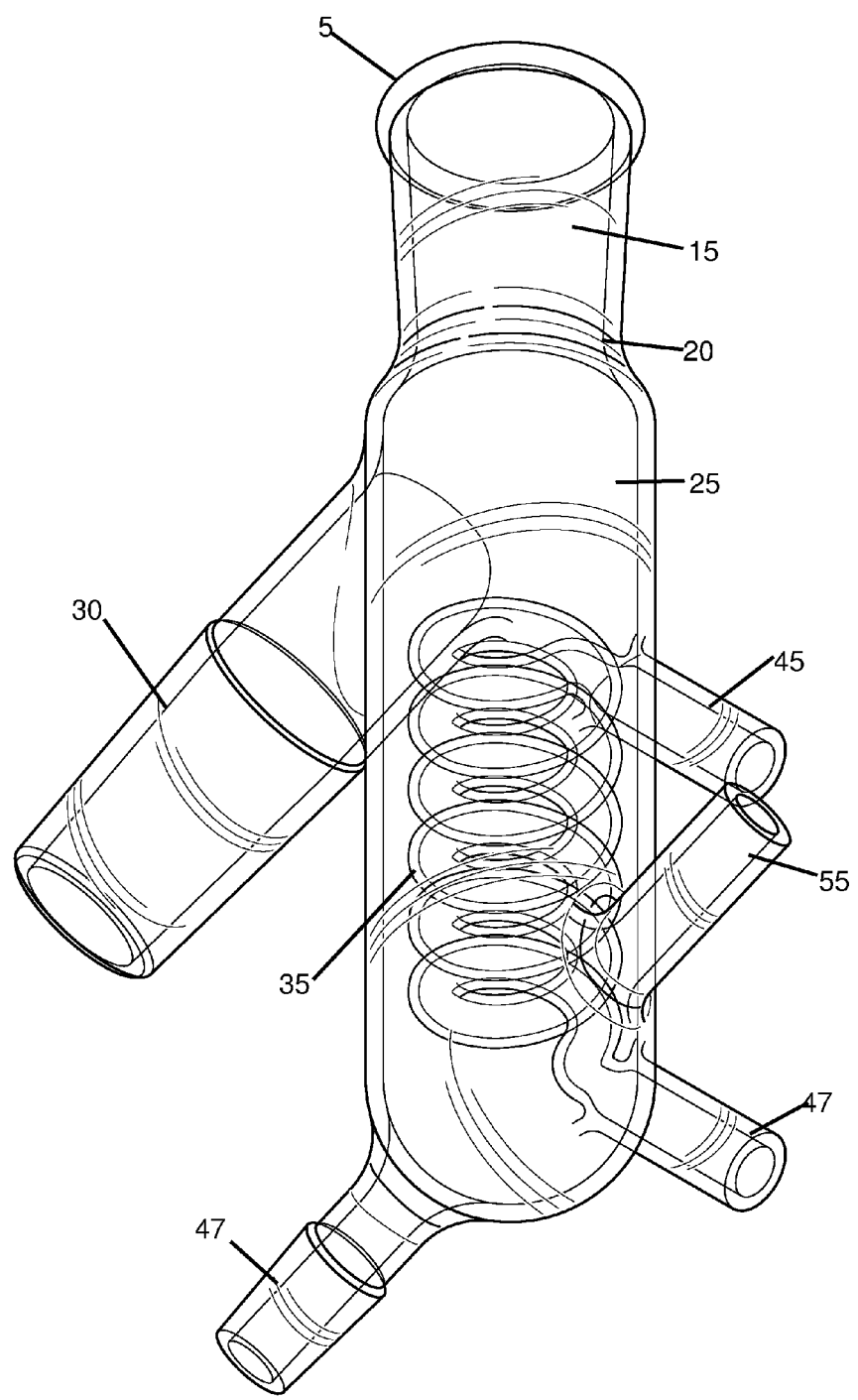
FIG. 3 shows a second perspective view of the distribution adapter of FIG. 2, from an opposite side.
Figure 4:
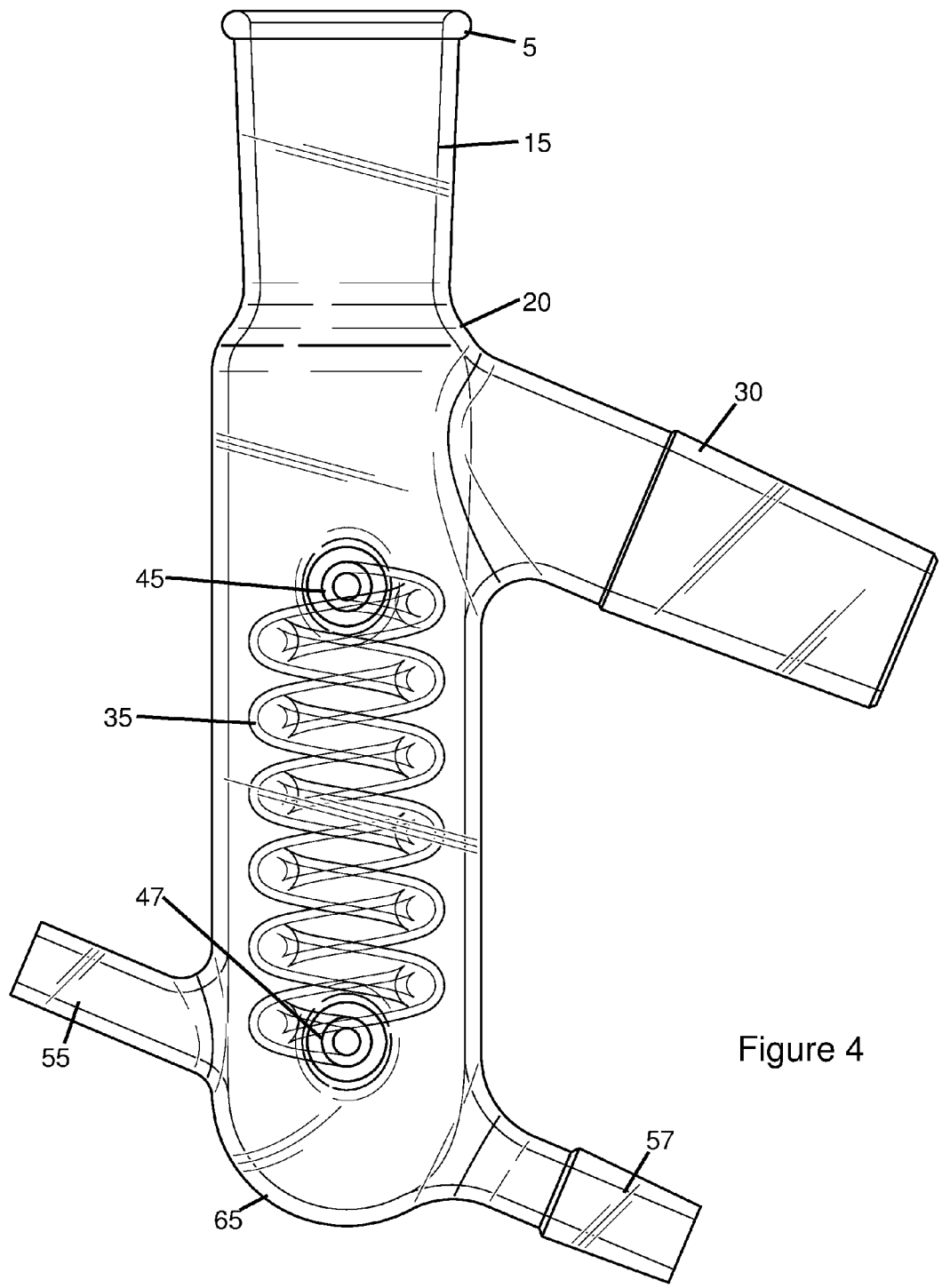
FIG. 4 shows a side elevation view of the distribution adapter of FIG. 2.
Figure 5:
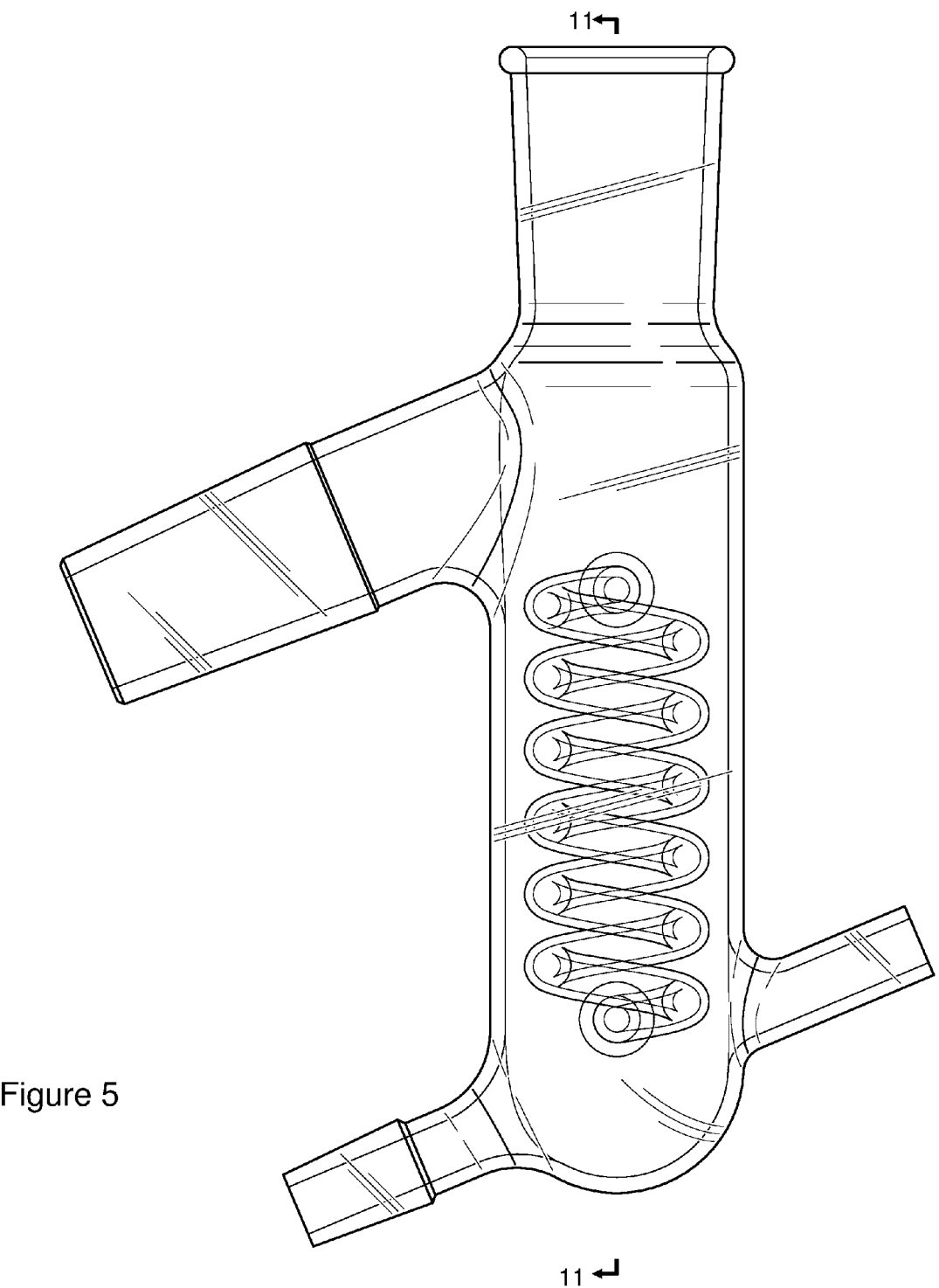
FIG. 5 shows a reverse side elevation view of the distribution adapter of FIG. 2.
Figure 6:
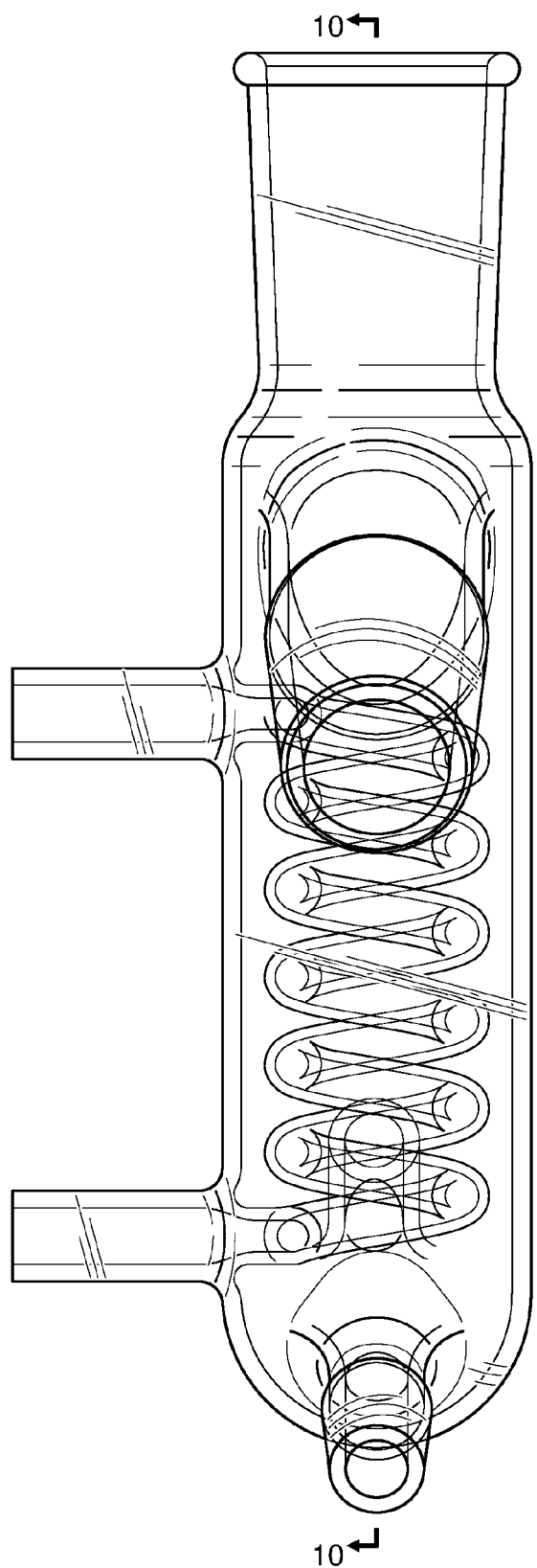
FIG. 6 shows a third side elevation view of the distribution adapter, rotated 90 degrees with respect to FIGS. 4 and 5.
Figure 7:
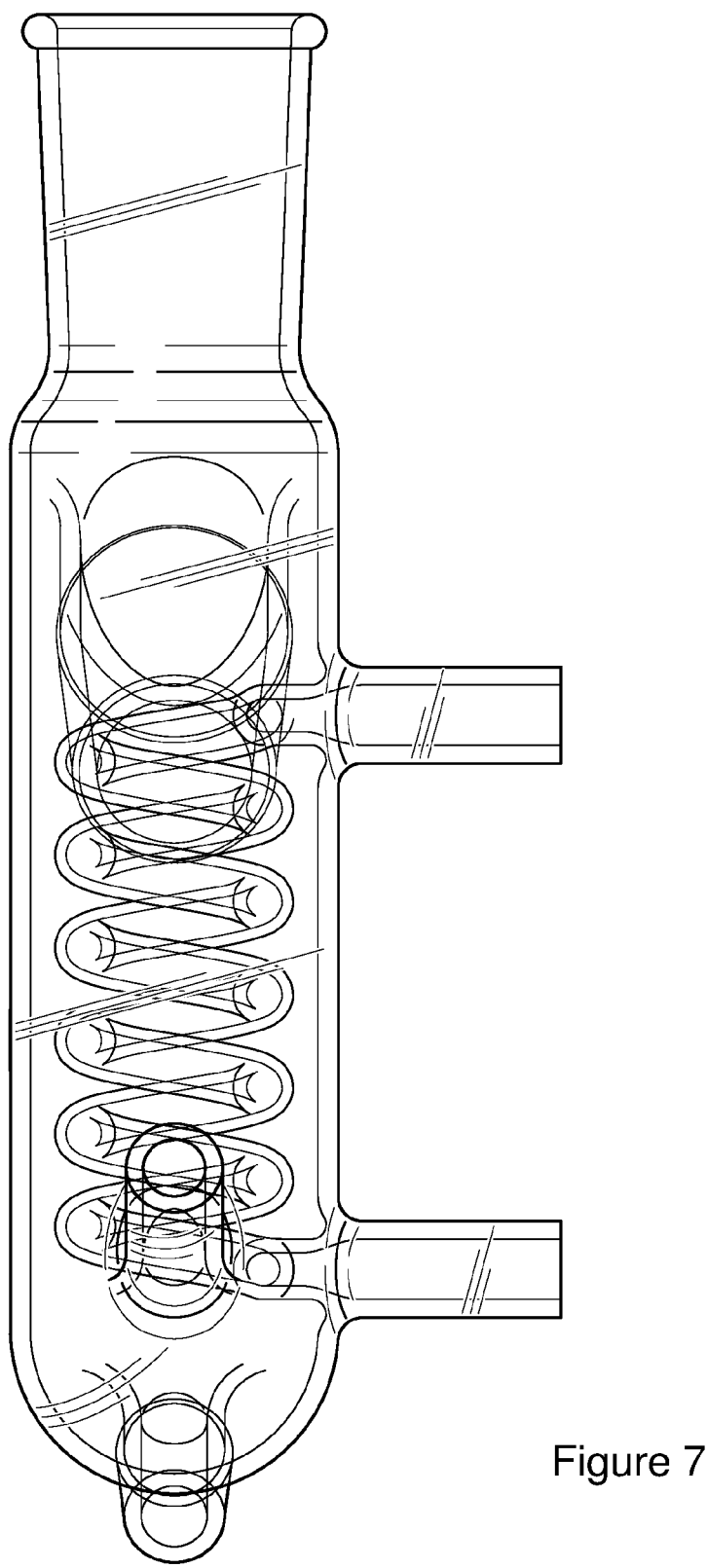
FIG. 7 shows a fourth side elevation view of the distribution adapter, rotated 90 degrees with respect to FIGS. 4 and 5 and 180 degrees with respect to FIG. 6.
Figure 8:
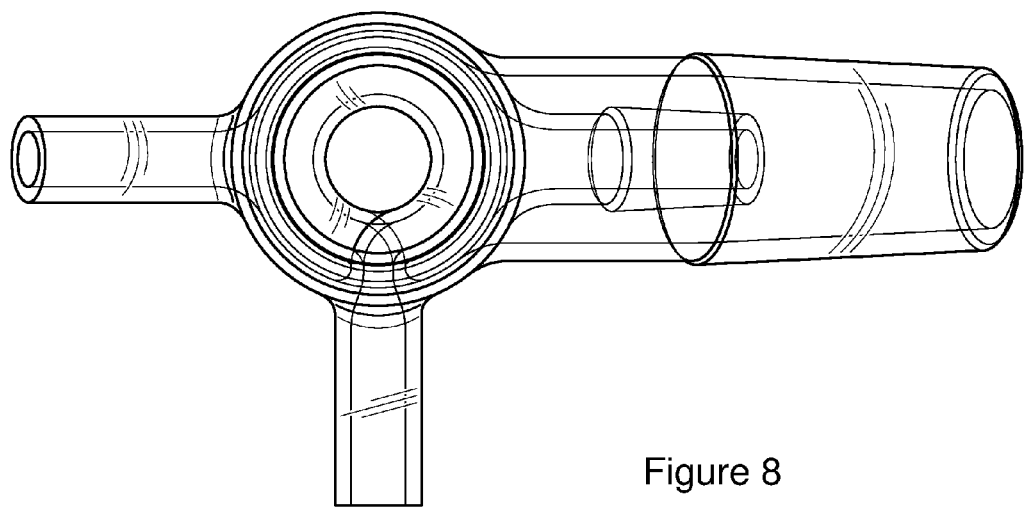
FIG. 8 shows a top plan view of the distribution adapter of FIG. 2.
Figure 9:
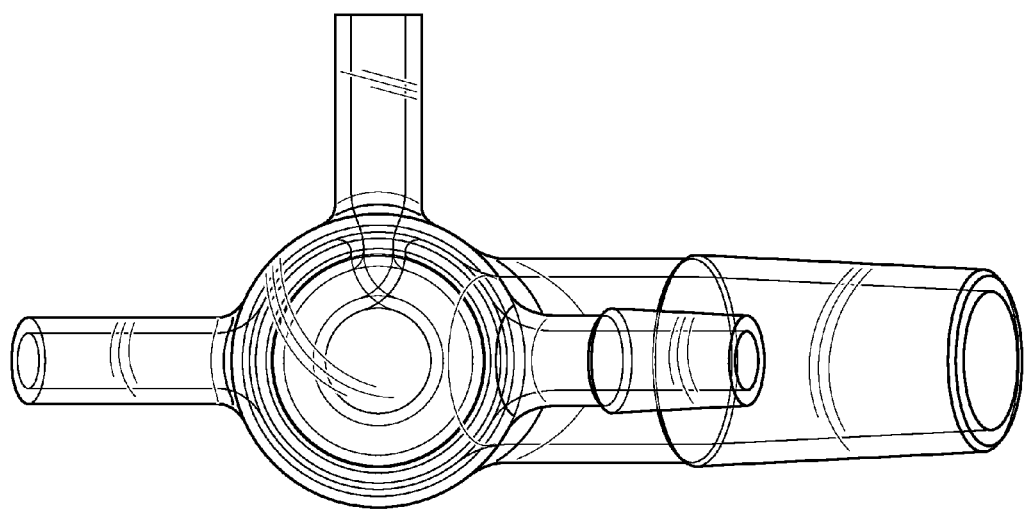
FIG. 9 shows a bottom plan view of the distribution adapter of FIG. 2.
Figure 10:
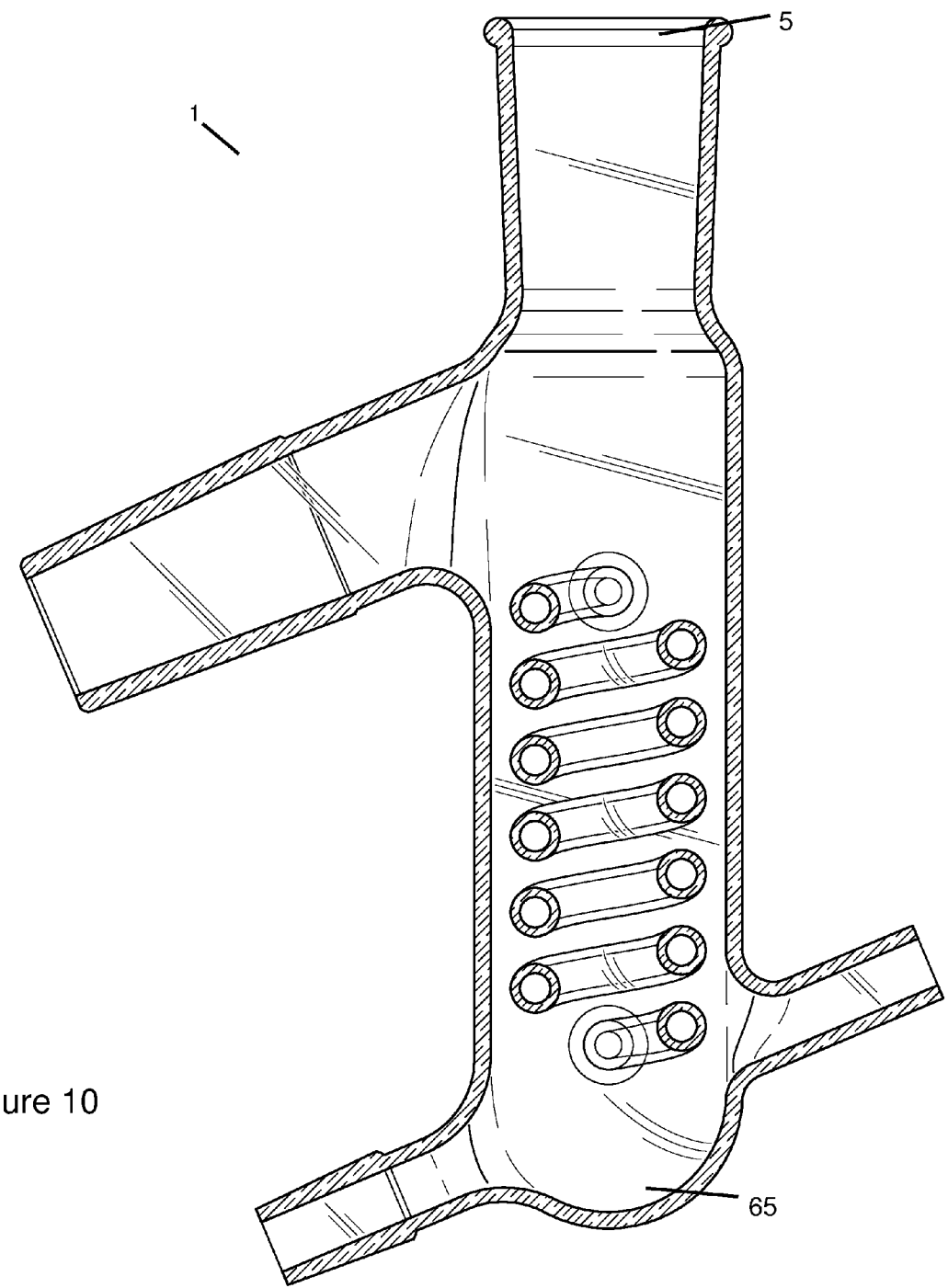
FIG. 10 shows an elevation view of the distribution adapter of FIG. 6 cut along section line 10.
Figure 11:
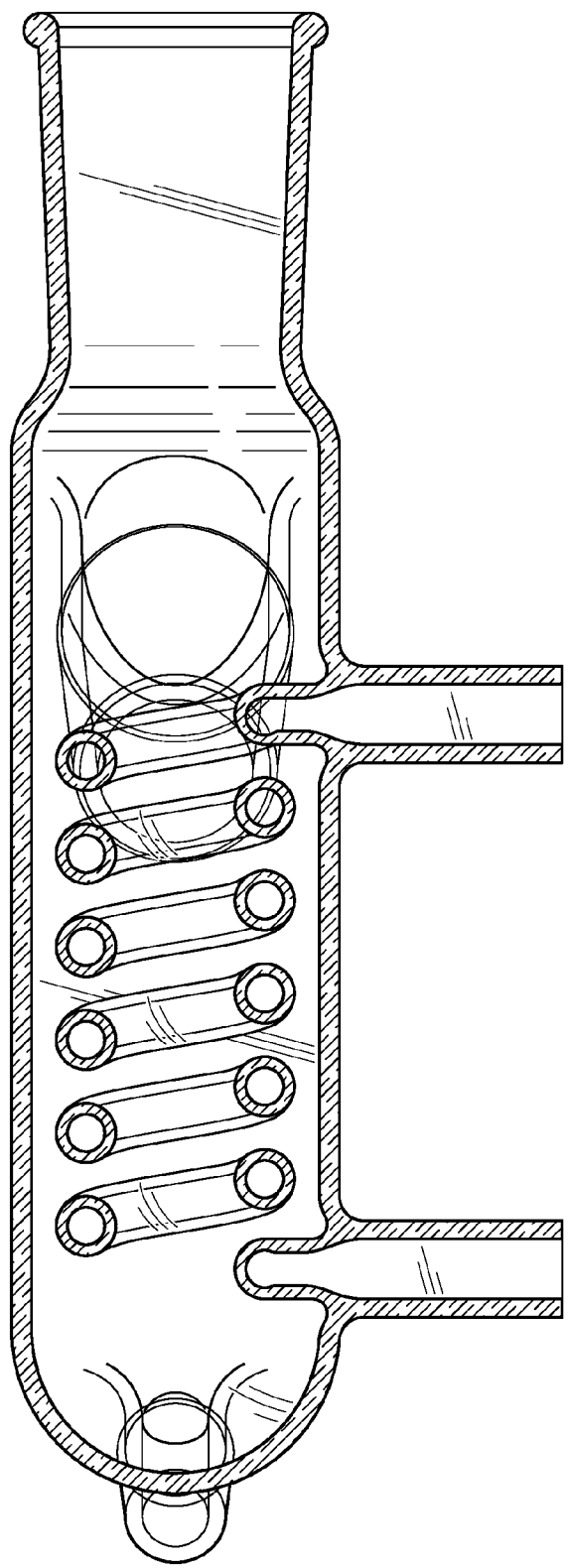
FIG. 11 shows an elevation view of the distribution adapter of FIG. 5 cut along section line 11.

FIG. 2 shows a first perspective view of the distribution adapter of FIG. 1. FIG. 3 shows a second perspective view of the distribution adapter of FIG. 2, from an opposite side. FIG. 4 shows a side elevation view of the distribution adapter of FIG. 2. FIG. 5 shows a reverse side elevation view of the distribution adapter of FIG. 2. FIG. 6 shows a third side elevation view of the distribution adapter, rotated 90 degrees with respect to FIGS. 4 and 5. FIG. 7 shows a fourth side elevation view of the distribution adapter, rotated 90 degrees with respect to FIGS. 4 and 5 and 180 degrees with respect to FIG. 6. FIG. 8 shows a top plan view of the distribution adapter of FIG. 2. FIG. 9 shows a bottom plan view of the distribution adapter of FIG. 2. FIG. 10 shows an elevation view of the distribution adapter of FIG. 6 cut along section line 10. FIG. 11 shows an elevation view of the distribution adapter of FIG. 5 cut along section line 11. The intake port 5 of the distribution adapter 1 is removably connected to the discharge section 130 of the distillation head 1. The intake port 5 further is the opening into a neck region 15 of the distribution adapter 1. The neck region is skinner (has a smaller circumference) than a main body region 25 of the distribution adapter.

Unless specified otherwise, for the remainder of the disclosure, parts discussed are part of the distribution adapter 1. The main body 25 or elongated main body region is the largest single element of the distribution adapter 1 having the greatest circumscribed volume. The elongated main body is connected to the neck 15 at a first end, and a closed lowest portion 65 at another side. Multiple ports are functionally connected to the main body 25. In order, from the first end to the closest lowest portion 65, one finds: the intake portal 5 and neck 15 opening into the first end of the main elongated body 25, followed by a drain port 30, and then in either order or at the same distance from the first end, a vacuum port 55 and a discharge port 57.

The drain port 30, being in closest proximity to the intake port 5, is where re-condensed vapors which have been distilled off a substance are in liquid form and exit to be collected in a flask functionally connected to the drain port. Thus, when one replaces the distribution adapter 1 with another during use, they are also typically changing a flask, and as such, a middle portion of glassware used during distillation is being changed out between fractions which are distilled. Said another way, there are multiple pieces of glassware used in distillation: a distillation head where the vapors rise vertically, a discharge chamber (e.g. discharge chamber 130) where the vapors are pulled out of a vertical section of a distillation head and begin descent, and a distribution adapter or cow where condensed vapors are separated into flasks. While in the prior art, one might change a flask, here, the actual distribution adapter itself is changed out during a single process of distillation.

The discharge port 57 is used to remove vapors which have not condensed before reaching the drain port 30 and which collect, in liquid form, at the lower end of the elongated main body/region 25. The vacuum port 55 is used to attach suction in order to create lower pressure within the system.

Further, in some embodiments, liquid chiller ports 45 and 57 are used which attach to a spiral chiller 35. The spiral chiller 35 is typically functionally unconnected to the main body 25, having it's own path of liquid flow. Hot or cold liquid can pass through, as desired, to heat or cool the chamber of the main body 25 by way of convection between the chiller 35 and interior of the main body 35 through which the spiral chiller passes within. The chiller ports 45 and 47 can be aligned with one another around one axis of the exterior of the main body 25. One of the chiller ports 45 or 47 can be aligned with, on a different axis than the other chiller port, the discharge port 57.

Further, referring to FIG. 1 especially, the angle of the distribution adapter 1, in embodiments of the disclosed technology, is such that the intake port 5 is the highest portion (relative to the ground or gravitationally determined bottom direction) of the adapter. The intake port has therewithin a portion of the distillation head which can extend through part or all of the neck region 15 and into the main body 25. In this manner, distillate product, in gas and/or liquid form, exits from the distillation unit, such a distillation unit 100 where a substance first extends vertically as vapors, straight into a main body 65 of the distribution chamber. Further, the drain port 30 can have it's most elongated direction extend vertically, as does the discharge port 57 which it is parallel to in embodiments of the disclosed technology. An acute angle is then formed between the most elongated length of the main body 25 (which is in parallel to and extends linearly from a discharge chamber 130) and each of the drain port 30 and discharge port 57.

Example temperatures in a vertical chamber of a distillation head 100 during distillation may be between 160-230 Celsius. where temperatures in the distribution adapter 1 can be between 45-75 Celsius. The present distribution adapter can be used as a initial cryogenic molecular vacuum accumulator and set to about −80 Celsius or below. Simulation of cryogenic environments show that molecular drag under vacuum is increased and attract molecules directly to an inner surface of the hollow glass distribution adapter. It should be understood that distribution adapters can be made of any inert material which is capable of withstanding the temperatures of the distillation/distribution. When using ultra high vacuum systems like diffusion pumps, turbo pumps or ion pumps a increased need in some distillation protocols to ensure the health and protection of ultra high vacuum package systems. The hotter the target side is, with vacuum targeting the point of least resistance versus the colder side where temperatures generate a molecular vacuum at levels where internal atmosphere does not exists so thermal transference of vacuum becomes very difficult. Further, rapid gas expusion from the distribution adapter may occur under high temperature vacuum. The construction of the present technology with a dry vacuum at the pump prevents this and attracts any and all solids, liquids or gases to attach to the coil mass. The mass does not need to be a exact coil and its shape can change based on needs.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalence of the claims are to be embraced within their scope. Combinations of any of the methods, systems, and devices described herein-above are also contemplated and within the scope of the disclosed technology.

I claim:

1. A distribution adapter for receiving distillate from a distillation unit with:
   an elongated main body;
   an intake port at a narrow side of said elongated main body adapted to removably connect to said distillation unit during distillation;
   a drain port and a discharge port opening into said elongated main body and on a same side as each other, said drain port having a larger circumference than said discharge port;
   a vacuum port opening into said elongated main body on an opposite side as said discharge port.

2. The distribution adapter of claim 1, further comprising a rounded end section of said elongated main body opposite said intake port, wherein said discharge port is between said rounded end section and said intake port.

3. The distribution adapter of claim 2, further comprising two chiller ports on a same side of said elongated main body, each opening into a single spiral chiller within said elongated main body.

4. The distribution adapter of claim 1, further comprising a portion of said distillation unit extending through a narrower neck region of said main body and into a wider region of said main body.

5. The distribution adapter of claim 1, wherein said drain port and said discharge port are in parallel to each other and at an acute angle to said elongated main body.

6. The distribution adapter of claim 5, wherein said distribution adapter is connected to said distillation unit and oriented such that said elongated main body is at an acute angle to the ground and a single exterior opening into said discharge port and a single exterior opening into said drain port faces towards the ground.

7. The distribution adapter of claim 1, wherein said distribution adapter is adapted to be attached and removed to said distillation unit during active distillation.

8. The distribution adapter of claim 7, wherein said distribution adapter is removed from said distillation head substantially after a first fraction is distilled and a second substantially identical distribution adapter to said distribution adapter is attached to said distillation unit during distillation of a second fraction.

9. A method of using a distribution adapter for receiving distillate from a distillation unit, comprising the steps of:
   attaching an intake port of said distribution adapter to an output of said distillation unit;
   distilling a substance through said distillation unit such that output therefrom enters said intake port of said distribution adapter;
   collecting liquefied condensation of said substance into a drain port of said distribution adapter, said drain port pointed downwards and at an acute angle to said intake port;
   orienting a discharge port which opens into an elongated body of said distribution adapter such that said discharge port opens into a substantially lowest point of said elongated body;
   removing said distribution adapter from said distillation unit after collection of a first fraction distilled from said substance and attaching a second distribution adapter to said distillation unit while distilling a second fraction of said substance.

10. The method of claim 9, wherein said distribution adapter further comprises a vacuum port which during said step of orienting is oriented upwards.

11. The method of claim 10, further comprising a step of applying an upwards suction force on said distribution adapter, said force extending through said vacuum port.

12. The method of claim 11, wherein an output end of said distillation unit extends through a narrower neck region of said distribution adapter into a wider main body of said distribution adapter, said narrower neck region connecting said intake port to said wider main body of said distribution adapter.

13. The method of claim 12, further comprising a step of cooling or heating said main body of said distribution adapter by passing fluid between two liquid chiller ports which open into a spiral-shaped chiller within said main body.

* * * * *